United States Patent
Kaitoku et al.

(10) Patent No.: US 10,076,799 B2
(45) Date of Patent: Sep. 18, 2018

(54) JOINED BODY OF DISSIMILAR METALS AND METHOD FOR PRODUCING JOINED BODY OF DISSIMILAR METALS

(71) Applicant: Kobe Steel, Ltd., Kobe-shi (JP)

(72) Inventors: Kazumasa Kaitoku, Fujisawa (JP); Tsuyoshi Matsumoto, Fujisawa (JP); Noritaka Eguchi, Fujisawa (JP); Toru Hashimura, Nagoya (JP)

(73) Assignee: Kobe Steel, Ltd., Kobe-shi (JP)

(*) Notice: Subject to any disclaimer, the term of this patent is extended or adjusted under 35 U.S.C. 154(b) by 0 days.

(21) Appl. No.: 15/036,246

(22) PCT Filed: Dec. 26, 2014

(86) PCT No.: PCT/JP2014/084628
§ 371 (c)(1),
(2) Date: May 12, 2016

(87) PCT Pub. No.: WO2015/111363
PCT Pub. Date: Jul. 30, 2015

(65) Prior Publication Data
US 2016/0297020 A1 Oct. 13, 2016

(30) Foreign Application Priority Data

Jan. 21, 2014 (JP) .................. 2014-008818

(51) Int. Cl.
*B23K 1/19* (2006.01)
*B23K 1/005* (2006.01)
(Continued)

(52) U.S. Cl.
CPC .............. *B23K 1/19* (2013.01); *B23K 1/0056* (2013.01); *B23K 26/323* (2015.10); *B23K 2203/20* (2013.01)

(58) Field of Classification Search
CPC .............. Y10T 403/477; Y10T 403/478; Y10T 403/479; B23K 1/0056; B23K 1/19; B23K 26/24; B23K 2203/20; F16B 5/08
(Continued)

(56) References Cited

U.S. PATENT DOCUMENTS 3,341,680 A * 9/1967 Rjabov ................ B23K 35/288
219/118
2005/0152741 A1* 7/2005 Fujimoto ............. B23K 9/0026
403/270
(Continued)

FOREIGN PATENT DOCUMENTS

| JP | 2009-279648 A | 12/2009 |
|----|---------------|---------|
| JP | 2010-99739 A  | 5/2010  |
| JP | 2010-137277 A | 6/2010  |

OTHER PUBLICATIONS

"Metals—Melting Temperatures." The Engineering ToolBox. N.p., n.d. Web. Apr. 12, 2017. <http://www.engineeringtoolbox.com/melting-temperature-metals-d_860.html>.*
(Continued)

*Primary Examiner* — Matthieu F Setliff
*Assistant Examiner* — Cory B Siegert
(74) *Attorney, Agent, or Firm* — Oblon, McClelland, Maier & Neustadt, L.L.P.

(57) ABSTRACT

A joined body of dissimilar metals, in which a flared joint is formed and which have a high joint strength, is provided. The joined body contains a first metal member having a curved surface portion, a second metal member having a higher melting point than the first metal member and joined to the first metal member to form the flared joint, and a joining metal portion formed by irradiating the first metal member and a filler material disposed between the first and second metal members with a laser. An intermetallic compound formed at the interface between the second metal
(Continued)

member and the joining metal portion has a thickness of at most 3 μm. A melted portion and a non-melted portion are formed in the curved surface portion of the first metal member in which the flared joint is formed.

5 Claims, 4 Drawing Sheets

(51) Int. Cl.
*B23K 26/323* (2014.01)
*B23K 103/20* (2006.01)

(58) Field of Classification Search
USPC ..................................... 403/270, 271, 272
See application file for complete search history.

(56) References Cited

U.S. PATENT DOCUMENTS

| | | | | |
|---|---|---|---|---|
| 2009/0017328 | A1* | 1/2009 | Katoh | B23K 9/173 428/653 |
| 2010/0098969 | A1* | 4/2010 | Hashimura | B21J 15/025 428/653 |
| 2010/0264199 | A1 | 10/2010 | Wakisaka et al. | |
| 2011/0020666 | A1 | 1/2011 | Wakisaka et al. | |
| 2013/0270235 | A1 | 10/2013 | Wakisaka et al. | |
| 2013/0272915 | A1 | 10/2013 | Wakisaka et al. | |
| 2013/0273390 | A1 | 10/2013 | Wakisaka et al. | |
| 2013/0341306 | A1* | 12/2013 | Kinefuchi | B23K 9/025 219/74 |
| 2015/0273630 | A1* | 10/2015 | Sakurada | B23K 26/32 403/272 |

OTHER PUBLICATIONS

International Search Report and Written Opinion dated Mar. 31, 2015 in PCT/JP14/084628, filed Dec. 26, 2014.

Extended European Search Report dated Aug. 22, 2017 in Patent Application No. 14879337.5.

* cited by examiner ial for the present invention is not particularly limited.

JOINED BODY OF DISSIMILAR METALS AND METHOD FOR PRODUCING JOINED BODY OF DISSIMILAR METALS

CROSS REFERENCE TO RELATED APPLICATIONS

This application is a 35 U.S.C. § 371 national stage patent application of international patent application PCT/JP14/084628, filed Dec. 26, 2014, the entire disclosure of which is incorporated herein by reference, and claims the benefit of the Japanese patent application No. 2014-008818, filed Jan. 21, 2014, the entire disclosure of which is also incorporated herein by reference.

TECHNICAL FIELD

The present invention relates to a joined body of dissimilar metals and a method for producing a joined body of dissimilar metals. More particularly, the present invention relates to a technology regarding joined bodies of dissimilar metals which are used in doors, fenders, roofs, and the like of automobiles.

BACKGROUND ART

In recent years, studies have been performed on partial replacement of conventionally used steels with light alloys of aluminum, magnesium, or the like when structures, such as automobiles, are manufactured. For that purpose, it is necessary to perform dissimilar material joining of a light alloy and a steel.

For example, Patent Literature 1 discloses a technique in which laser brazing is used not only for joining similar materials, such as steels, but also for dissimilar material joining, e.g., of an aluminum member and a steel. Laser brazing for dissimilar material joining can be used in various applications, for example, for doors, panel members, roofs, and the like. Furthermore, Patent Literature 2 discloses a technique in which an aluminum member and a steel member are subjected to arc welding, the joining part of the aluminum alloy member is melted and joined, and the joining part of the steel member is joined by forming a thin intermetallic compound.

Examples of the shape of the weld joint of these weld joined bodies include a butt joint, a lap joint, and the like. Furthermore, from the viewpoint of assembling members and the like, a flared joint is another example of the shape of the weld joint. In automotive fenders and the like, since the appearance can be improved, it may be useful to form a structural member using a flared joint, instead of a roof rail method, in some cases. In joining the flared joint, fusion welding is generally used. For example, Patent Literature 3 discloses a technique in which laser brazing using a laser and a filler material, such as a brazing filler metal, is applied in order to suppress thermal strain during welding.

CITATION LIST

Patent Literature

PTL 1: Japanese Unexamined Patent Application Publication No. 2009-056508
PTL 2: Japanese Unexamined Patent Application Publication No. 2003-211270
PTL 3: Japanese Unexamined Patent Application Publication No. 2008-000814

SUMMARY OF INVENTION

Technical Problem

However, in brazing fusion welding of members made of dissimilar metal materials, since a brittle intermetallic compound is formed at the joint interface of the melted metal portion, the joining strength may be decreased compared with a joined body of similar materials in some cases. Furthermore, in laser brazing using laser welding, although the thickness of the intermetallic compound is decreased, the heat input is smaller than that in arc welding, and therefore, further studies are required in order to apply this technique to structures made of dissimilar metals. Moreover, in the flared joint, it is difficult to form a melted portion compared with the butt joint or the lap joint. In particular, in the case where the flared joint is applied to joining of dissimilar metals, it is difficult to obtain strength at the joining portion while suppressing generation of an intermetallic compound, and it has not been possible to obtain a joined body of dissimilar metals having a high joining strength.

Accordingly, it is a main object of the present invention to provide a joined body of dissimilar metals in which a flared joint is formed and which has a high joining strength, and a method for producing the same.

Solution to Problem

The present invention has been achieved as a result of thorough studies by the present inventors in order to solve the problems described above, and provides a joined body of dissimilar metals including a first metal member having a curved surface portion, a second metal member having a higher melting point than the first metal member and joined to the first metal member to form a flared joint, and a joining metal portion formed by irradiating a filler material and the first metal member with a laser, the filler material being disposed at the joining portion between the first metal member and the second metal member, in which the maximum thickness of an intermetallic compound formed at the interface between the second metal member and the joining metal portion is 3 μm or less, and in the curved surface portion of the first metal member on which the flared joint is formed, a melted portion and a non-melted portion are formed in this order in the thickness direction from the side on which the joining metal portion is formed.

Furthermore, in the joined body of dissimilar metals, in a direction perpendicular to the thickness direction of the intermetallic compound and in which the second metal member extends in a flared manner, the maximum length of a region in which the second metal member and the joining metal portion are joined to each other may be 2 to 4 mm.

Furthermore, in the joined body of dissimilar metals, in the direction in which the melted portion and the non-melted portion of the first metal member are formed in this order, the depth of the non-melted portion may be 0.5 to 0.9 times the total depth of the melted portion and the non-melted portion.

Furthermore, the first metal member may be made of a light alloy material, and the second metal member may be made of a steel.

Furthermore, the present invention provides a method for producing a joined body of dissimilar metals including a step of placing a filler material in a joining portion between a first metal member having a curved surface portion and a second metal member having a higher melting point than the first metal member and joined to the first metal member to form a flared joint, and a step of performing laser irradiation at an irradiation angle inclined by 15 degrees or less with respect to a joint surface of the joint of the first metal member and the second metal member, in which the maximum thickness of an intermetallic compound formed at the interface between the second metal member and the joining metal portion is 3 µm or less, and in the curved surface portion of the first metal member on which the flared joint is formed, a melted portion and a non-melted portion are formed in this order in the thickness direction from the side on which the joining metal portion is formed.

Advantageous Effects of Invention

According to the present invention, it is possible to obtain a joined body of dissimilar metals in which a flared joint is formed and which has a high joining strength.

DESCRIPTION OF EMBODIMENTS

Embodiments will be described in detail below. However, it is to be understood that the present invention is not limited to the embodiments described below.

<Joined Body of Dissimilar Metals 1>

Figure 1:
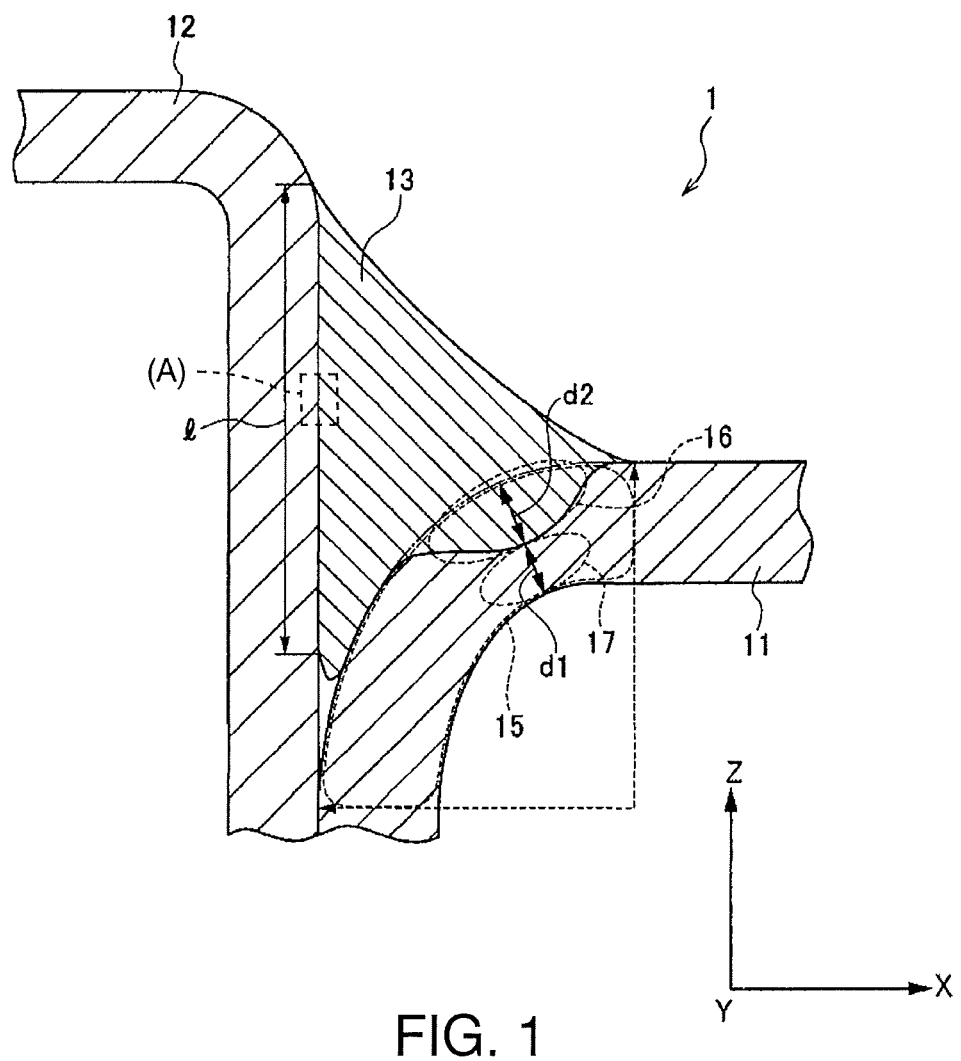
FIG. 1 is a cross-sectional view of the joined body of dissimilar metals 1 according to the embodiment.
Figure 2:
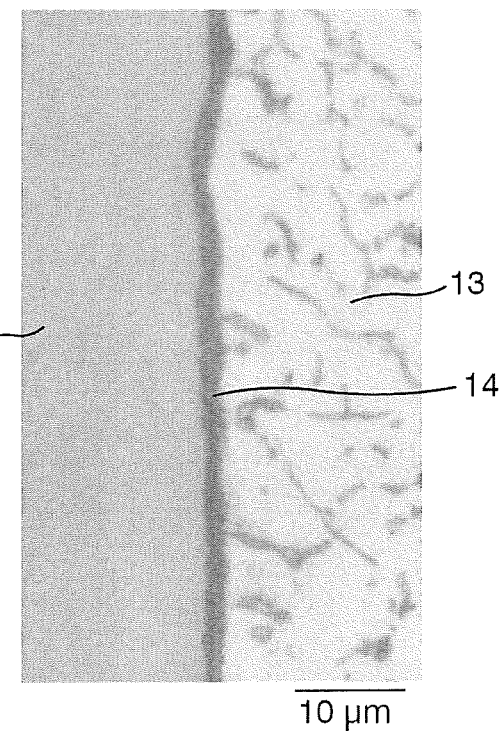
FIG. 2 is a photograph showing an enlarged cross section of a region represented by reference sign (A) in FIG. 1.

First, a joined body of dissimilar metals 1 according to an embodiment of the present invention will be described. FIG. 1 is a cross-sectional view of the joined body of dissimilar metals 1 according to the embodiment. Furthermore, FIG. 2 is a photograph showing an enlarged cross section of a region represented by reference sign (A) in FIG. 1.

As shown in FIG. 1, the joined body of dissimilar metals 1 according to the embodiment includes a first metal member 11 having a curved surface portion 15, a second metal member 12 which forms a flared joint together with the first metal member 11 (i.e., second metal member 12 joined to the first metal member 11 to form a flared joint), and a joining metal portion 13 formed by irradiating a filler material and the first metal member 11 with a laser, the filler material being disposed at the joining portion between the first metal member 11 and the second metal member 12. Furthermore, the thickness of an intermetallic compound 14 formed at the interface between the second metal member 12 and the joining metal portion 13 is 3 µm or less. Furthermore, in the curved surface portion 15 of the first metal member 11 on which the flared joint is formed, a melted portion 16 and a non-melted portion 17 are formed in this order in the thickness direction from the side on which the joining metal portion 13 is formed.

As shown in FIG. 1, the flared joint in the joined body of dissimilar metals 1 according to the embodiment may be a weld joint for welding in a groove formed by an arc-like curved surface and a planar surface, in cross section, or a weld joint for welding in a groove formed by an arc-like curved surface and an arc-like curved surface. That is, the first metal member 11 and the second metal member 12 may extend in the X-axis direction with a difference in level therebetween in the Z-axis direction, or may extend in the X-axis direction without a difference in level therebetween.

[First Metal Member 11]

The first metal member 11 is not particularly limited as long as it has the curved surface portion 15 and is made of a metal material, and for example, can be made of a light alloy material. Specific examples of the light alloy material include aluminum, aluminum alloys (JIS 2000 series, 3000 series, 4000 series such as A4043 and A4047, 5000 series, 6000 series, or 7000 series), magnesium, and magnesium alloys.

The bend radius of the curved surface portion 15 of the first metal member 11 is not particularly limited, but is preferably 0.5 to 5 mm. By setting the bend radius of the curved surface portion 15 in this range, the joining strength of the joined body of dissimilar metals 1 can be increased.

[Second Metal Member 12]

The second metal member 12 is not particularly limited as long as it is made of a metal material, has a higher melting point than the first metal member 11, and forms a flared joint together with the first metal member 11, and for example, can be made of a steel. Examples of the steel include high tensile strength steels, galvanized steel sheets, and stainless steels.

[Joining Metal Portion 13]

The joining metal portion 13 is formed by performing laser irradiation on a filler material disposed at the joining portion between the first metal member 11 and the second metal member 12 and its surrounding first metal member 11. In a direction perpendicular to the thickness direction of the intermetallic compound 14 and in which the second metal member 12 extends in a flared manner (in the Z-axis direction in the drawing), the maximum length of a region in which the second metal member 12 and the joining metal portion 13 are joined to each other (hereinafter, also referred to as the "joint length") 1 is preferably 2 mm or more. Furthermore, the joint length 1 is preferably 4 mm or less. By setting the joint length 1 in this range, the joining metal portion 13 and the second metal member 12 are joined to each other at a high joining strength.

The filler material is not particularly limited, and for example, a brazing filler metal or the like may be used. Specifically, in the case where the first metal member 11 is an aluminum material and the second metal member 12 is a steel, as the filler material, an aluminum alloy filler material (4043 or 4047) or the like can be used. Preferably, a flux-cored wire (FCW) having a sheath made of an aluminum alloy including 2.0% by mass of Si, 0.2% by mass of Ti, and the balance being incidental impurities (0.1% by mass or less of Cr, 0.1% by mass or less of Zn, 40 ppm or less of B, and 0.05% by mass or less of other elements, the total amount of the incidental impurities being 0.15% by mass or less) and aluminum, the sheath being filled with a flux including 28% by mass of cesium fluoride and the balance being substantially a KALF-based flux at a filling ratio of 5%, in which the wire diameter is 1.2 to 2 mm, can be used as the filler material. Thereby, it is possible to obtain a joint having a high joining strength while decreasing the thickness of the intermetallic compound 14.

In the joined body of dissimilar metals 1 according to the embodiment, the thickness of the intermetallic compound 14 formed at the interface between the second metal member 12 and the joining metal portion 13 is set at 3 µm or less (refer to FIG. 2). More preferably, the thickness is set at 1.5 µm or less. By decreasing the thickness of the intermetallic compound 14 as much as possible in such a manner, the joining metal portion 13 and the second metal member 12 are joined to each other at a high joining strength.

Furthermore, in the joined body of dissimilar metals 1 according to the embodiment, as shown in FIG. 1, in the curved surface portion 15 of the flared joint of the first metal member 11, a melted portion 16 and a non-melted portion 17 are formed in this order in the thickness direction from the side on which the joining metal portion 13 is formed. The melted portion 16 is formed by melting of the filler material and the first metal member 11 due to laser irradiation, and is also part of the joining metal portion 13. Furthermore, the non-melted portion 17 is part not melted by laser irradiation in the curved surface portion 15 of the first metal member 11.

Figure 3A:
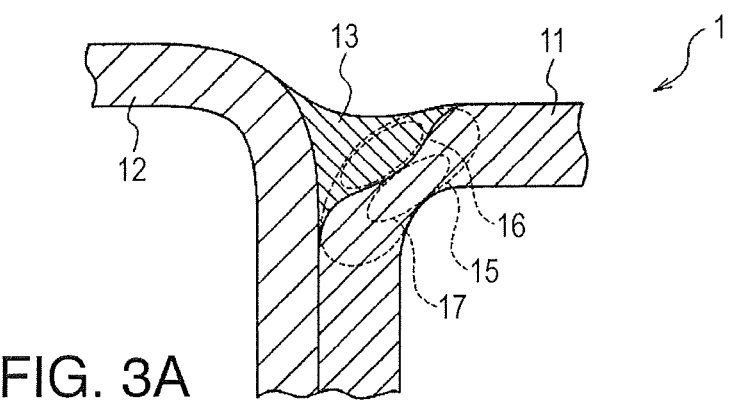
FIG. 3A is a cross-sectional view of the joined body of dissimilar metals 1 according to the embodiment.
Figure 3B:
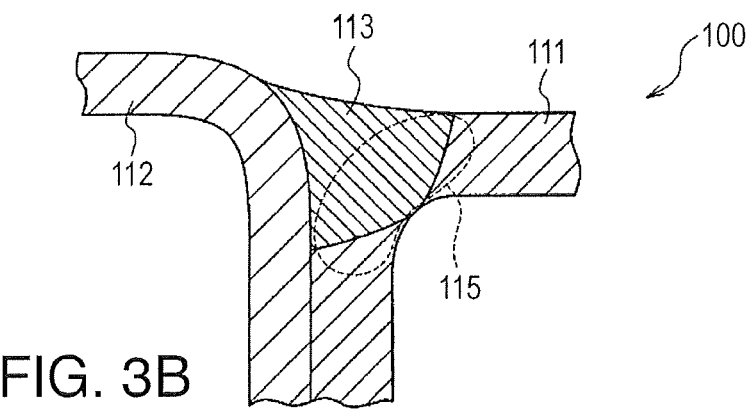
FIG. 3B is a cross-sectional view of a joined body of dissimilar metals 100 according to a related art.
Figure 3C:
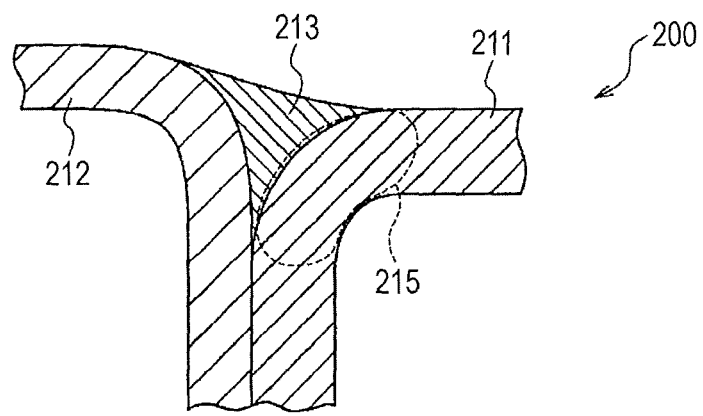
FIG. 3C is a cross-sectional view of a joined body of dissimilar metals 200 according to a related art.

In the joined body of dissimilar metals 1 according to the embodiment, a structure in which the melted portion 16 and the non-melted portion 17 are formed in the curved surface portion 15 will be described below with reference to FIGS. 3A to 3C. FIG. 3A is a cross-sectional view of the joined body of dissimilar metals 1 according to the embodiment. FIGS. 3B and 3C are each a cross-sectional view of a joined body of dissimilar metals 100 or 200 according to a related art.

In the joined body of dissimilar metals 100 shown in FIG. 3B, a non-melted portion is not formed in a curved surface portion 115. That is, a joining metal portion 113 is formed so as to pass through the curved surface portion 115 from the outer side to the inner side. The mechanical strength of the joining metal portion 113 is lower than the mechanical strength of a first metal member 111 which is a base metal. Furthermore, in the first metal member 111, the mechanical strength decreases because of softening under the influence of laser heat during laser irradiation. Therefore, the joined body of dissimilar metals 100 cannot have a sufficient joining strength.

Furthermore, in the joined body of dissimilar metals 200 shown in FIG. 3C, a melted portion is not formed in a curved surface portion 215. That is, in the joined body of dissimilar metals 200, only the filler material is substantially melted by laser irradiation in the joining metal portion, and a first metal member 1 is not substantially melted by laser irradiation. Therefore, the joining metal portion 213 is likely to peel off at the interface with the first metal member 211, and the joined body of dissimilar metals 200 also cannot have a sufficient joining strength.

In contrast, in the joined body of dissimilar metals 1 according to the embodiment shown in FIG. 3A, as described above, the melted portion 16 and the non-melted portion 17 are formed in the curved surface portion 15. Therefore, the joining metal portion 13 is unlikely to peel off from the first metal member 11, and it is possible to prevent a decrease in the mechanical strength of the first metal member 11 due to heat. Consequently, the joined body of dissimilar metals 1 can have a high joining strength.

In the joined body of dissimilar metals 1 according to the embodiment, in the direction in which the melted portion 16 and the non-melted portion 17 of the first metal member 11 are formed in this order, the depth of the non-melted portion 17 (refer to reference sign d1 in FIG. 1) is preferably 0.5 or more times the total depth of the melted portion 16 and the non-melted portion 17 (refer to reference sign d1+d2 in FIG. 1). Furthermore, the depth of the non-melted portion 17 (d1) is preferably 0.9 or less times the total depth of the melted portion 16 and the non-melted portion 17 (d1+d2). Thereby, the joined body of dissimilar metals 1 according to the embodiment can have a higher joining strength.

<Method for Producing Joined Body of Dissimilar Metals 1>

Figure 4:
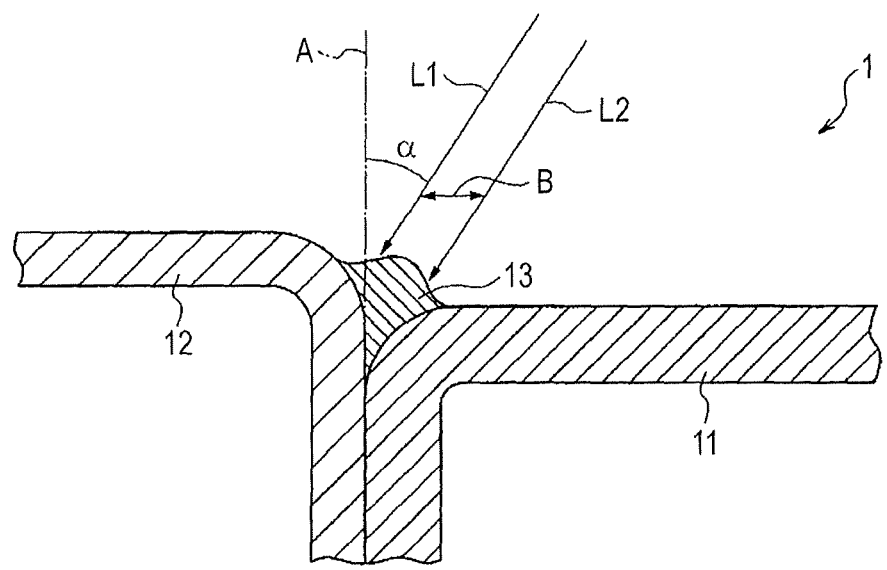
FIG. 4 is a view for illustrating a laser beam irradiation method for producing the joined body of dissimilar metals 1 according to the embodiment.

With reference to FIG. 4, a method for producing a joined body of dissimilar metals 1 according to the embodiment will be described below. FIG. 4 is a view for illustrating a laser beam irradiation method for producing the joined body of dissimilar metals 1 according to the embodiment.

As shown in FIG. 4, the joined body of dissimilar metals 1 is obtained by brazing in which with a filler material being fed and placed in the lap portion (joining portion) of the joint of the first metal member 11 and the second metal member 12, by applying a laser beam L1, part of the first metal member 11 is melted. In this case, preferably, the laser beam L1 is applied at an irradiation angle inclined by 15 degrees or less (angle α in the drawing) with respect to a joint surface (surface A) of the joint of the first metal member 11 and the second metal member 12. More preferably, the inclined angle α is 5 to 10 degrees. By applying the laser beam L1 in an inclined manner as described above, it is possible to easily form the melted portion 16 and the non-melted portion 17 in the first metal member 11 and obtain the joined body of dissimilar metals 1.

Furthermore, when a laser beam is applied, by shifting the laser beam by about 0.5 to 1.5 mm (refer to reference sign B in the drawing) from the position where the filler material is disposed (refer to reference sign L1→L2 in the drawing), heat from the laser beam L2 is indirectly conducted from the first metal member 11 to the joining portion. Therefore, growth of the intermetallic compound 14 is suppressed, and the thickness of the intermetallic compound 14 can be decreased to 3 µm or less with higher accuracy. Thus, the joining strength of the joined body of dissimilar metals 1 can be improved. Furthermore, by shifting the laser irradiation position toward the aluminum side (first metal member 11), it is possible to obtain a sufficient amount of penetration.

As the laser, various lasers, such as fiber lasers, disc lasers, YAG lasers, and semiconductor lasers, can be used. Furthermore, in order to shift the laser beam irradiation position as described above and at the same time to prevent the laser beam from being directly applied to the steel sheet because of the positional relation to the wire, the beam diameter is preferably set at 0.1 to 3.0 mm.

The filler material, such as a brazing filler metal, and the first metal member 11 are melted by the laser beam irradiation, and the joining metal portion 13 formed on the surface of the second metal member 12 can enter between the first metal member 11 and the second metal member 12. It is possible to obtain the joined body of dissimilar metals 1 according to the present invention in which the melted portion 16 and the non-melted portion 17 are formed in the curved surface portion 15 of the first metal member 11, and the maximum thickness of an intermetallic compound formed at the interface between the second metal member 12 and the joining metal portion 13 is 3 µm or less.

As described above in detail, in the joined body of dissimilar metals 1 according to the embodiment, the melted portion 16 and the non-melted portion 17 are formed in the first metal member 11, and the maximum thickness of the intermetallic compound 14 formed at the interface between the second metal member 12 and the joining metal portion 13 is restricted in the range of 3 μm or less. Therefore, the joining strength can be increased. In particular, in a direction perpendicular to the thickness direction of the intermetallic compound 14 and in which the second metal member 12 extends in a flared manner, the maximum length of a region in which the second metal member 12 and the joining metal portion 13 are joined to each other may be specified at 2 to 4 mm. Furthermore, in the direction in which the melted portion 16 and the non-melted portion 17 of the first metal member 11 are formed in this order, the depth of the non-melted portion 17 may be specified at 0.5 to 0.9 times the total depth of the melted portion 16 and the non-melted portion 17. By specifying the maximum length and/or the length of the non-melted portion as described above, the joining strength can be further increased.

EXAMPLES

The advantageous effects of the present invention will be specifically described below on the basis of examples of the present invention and comparative examples.

Figure 5:
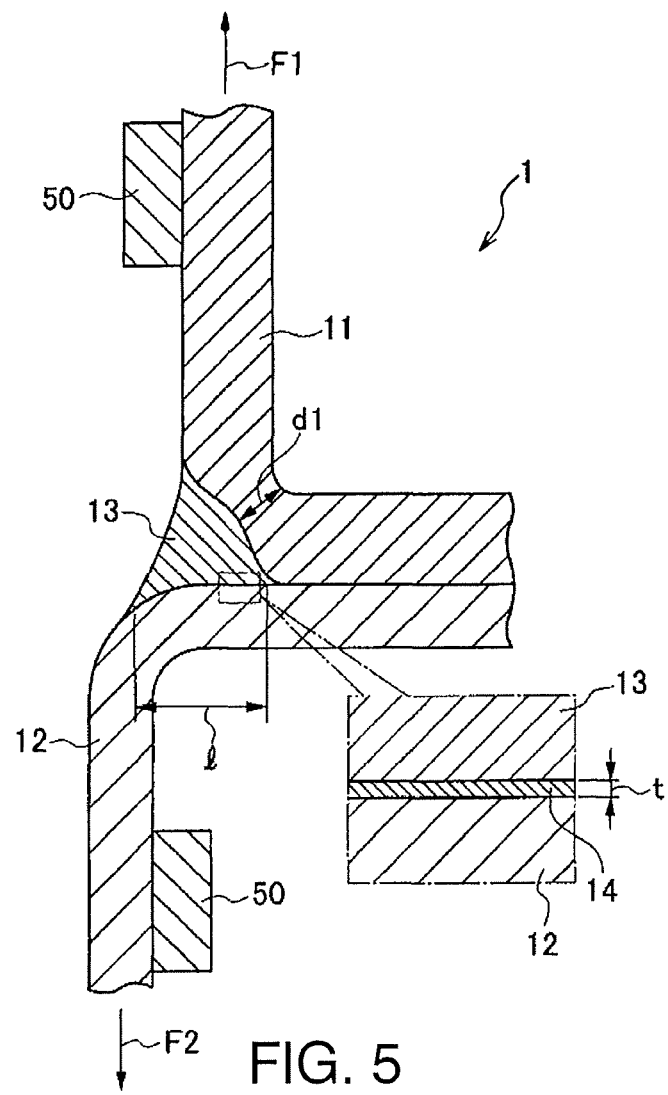
FIG. 5 is a schematic view for illustrating a tensile test of joined bodies of dissimilar metals.

FIG. 5 is a schematic view for illustrating a tensile test of joined bodies of dissimilar metals. As shown in FIG. 5, by changing the joint length 1 of the second metal member 12 and the joining metal portion 13, the thickness t of the intermetallic compound 14, and the depth d1 of the remainder of the base metal (non-melted portion) in the curved surface portion of the first metal member 11, the tensile strength of the joined body of dissimilar metals 1 was measured three times, and the average was evaluated. The tensile test was conducted by using a spacer 50 and pulling the joined body of dissimilar metals in the directions of arrows F1 and F2.

An aluminum alloy 6022 was used as the first metal member 11, and an SPCC (uncoated steel sheet) was used as the second metal member 12. As the filler material, a flux-cored wire (FCW) having a sheath made of an aluminum alloy including 2.0% by mass of Si, 0.2% by mass of Ti, and the balance being incidental impurities (0.1% by mass or less of Cr, 0.1% by mass or less of Zn, 40 ppm or less of B. and 0.05% by mass or less of other elements, the total amount of the incidental impurities being 0.15% by mass or less) and aluminum, the sheath being filled with a flux including 28% by mass of cesium fluoride and the balance being substantially a KALF-based flux at a filling ratio of 5%, in which the wire diameter was 1.8 mm, was used.

Furthermore, the first metal member 11 was set at 1.2 mmt (d1+d2), and the second metal member 12 was set at 0.7 mmt. The laser output was set at 2.8 to 3.8 kW. The spot diameter of the beam (mm) was set at 1.8φ or 3.0φ. The torch angle was set at 100, and the forehand/backhand angle was set at 0°. The welding speed was set at 1 to 3 m/min. Furthermore, the wire feed rate was set at 4.0 to 8.0 m/min. Regarding the different joined body of dissimilar metals, the tensile strength is shown in Table 1.

TABLE 1

| | Laser output (kW) | Spot diameter (mm) | Welding speed (m/min) | Wire feed rate (m/min) | Shoulder R (mm) | t (μm) | d1 (mm) | d1/(d1 + d2) | Joint length l (mm) | Throat l2 (mm) | Tensile strength (N/mm) |
|---|---|---|---|---|---|---|---|---|---|---|---|
| Example 1 | 2.8 | 1.8 | 1 | 4 | 0.5 | 2.7 | 0.756 | 0.63 | 2.07 | 1.53 | 144 |
| Example 2 | 2.8 | 1.8 | 1 | 4 | 1 | 2.06 | 0.707 | 0.59 | 2.33 | 1.47 | 160 |
| Example 3 | 2.8 | 1.8 | 1 | 4 | 5 | 1.14 | 0.836 | 0.70 | 2.33 | 0.93 | 123 |
| Example 4 | 2.8 | 1.8 | 2 | 5 | 0.5 | 1.3 | 0.934 | 0.78 | 2.4 | 0.93 | 164 |
| Example 5 | 2.8 | 1.8 | 2 | 5 | 1 | 1.3 | 0.867 | 0.72 | 2.27 | 0.87 | 175 |
| Example 6 | 2.8 | 1.8 | 2 | 8 | 3 | 1.17 | 0.847 | 0.71 | 2.6 | 1.2 | 173 |
| Example 7 | 2.8 | 1.8 | 2 | 8 | 5 | 1.52 | 0.792 | 0.66 | 2.73 | 1.27 | 136 |
| Example 8 | 3.3 | 1.8 | 3 | 8 | 0.5 | 0.8 | 0.928 | 0.77 | 2 | 0.87 | 142 |
| Example 9 | 3.3 | 1.8 | 3 | 8 | 3 | 1.32 | 0.549 | 0.50 | 2.33 | 1.07 | 120 |
| Example 10 | 3.5 | 3 | 2 | 8 | 0.5 | 0.8 | 0.652 | 0.54 | 2.47 | 1.27 | 167 |
| Example 11 | 3.5 | 3 | 2 | 8 | 1 | 0.8 | 0.707 | 0.59 | 2.47 | 1.27 | 183 |
| Example 12 | 3.5 | 3 | 1 | 4 | 3 | 2.67 | 0.289 | 0.24 | 0.93 | 1.4 | 69 |
| Example 13 | 3.5 | 3 | 2 | 8 | 5 | 2.63 | 0.65 | 0.54 | 1.33 | 0.93 | 70 |
| Example 14 | 3.8 | 3 | 3 | 4 | 1 | 2.8 | 0.645 | 0.54 | 1.67 | 0.87 | 96 |
| Comparative Example 1 | 3.3 | 1.8 | 3 | 8 | 5 | 7 | 0.269 | 0.22 | 1.37 | 0.93 | 44 |
| Comparative Example 2 | 3.5 | 3 | 1 | 4 | 0.5 | 3.6 | 0.234 | 0.20 | 1 | 2.07 | 56 |
| Comparative Example 3 | 3.5 | 3 | 1 | 4 | 1 | 4.2 | 0.258 | 0.22 | 1.26 | 1.73 | 48 |
| Comparative Example 4 | 3.5 | 3 | 1 | 4 | 5 | 8 | 0.079 | 0.07 | 0 | 1.5 | 0 |
| Comparative Example 5 | 3.8 | 3 | 3 | 8 | 3 | 3.2 | 0.6 | 0.50 | 1.8 | 1 | 69 |

In Examples 1 to 14, the thickness t of the intermetallic compound formed between the second metal member 12 and the joining metal portion 13 is 3 µm or less, and in the curved surface portion of the flared joint of the first metal member 11, a melted portion and a non-melted portion are formed in this order in the thickness direction from the side on which the joining metal portion 13 is formed. Therefore, the results show that a high tensile strength is obtained, and the joining strength is good. Among them, in Examples 1 to 11, the joint length 1 is 2 to 4 mm, and the d1/(d1+d2) is 0.5 to 0.9. Therefore, the results show that a higher tensile strength is obtained, and the joining strength is particularly good.

On the other hand, in Comparative Examples 1 to 5, the thickness t of the intermetallic compound formed between the second metal member and the joining metal portion is more than 3 µm. Therefore, it was not possible to obtain a sufficient joining strength.

From the results described above, it has been confirmed that in the joined body of dissimilar metals according to the present invention, the joining strength can be increased.

REFERENCE SIGNS LIST 1 joined body of dissimilar metals
11 first metal member
12 second metal member
13 joining metal portion
14 intermetallic compound
15 curved surface portion
16 melted portion
17 non-melted portion

The invention claimed is:

1. A joined body of dissimilar metals, comprising:
   a first metal member having a curved surface portion;
   a second metal member having a higher melting point than the first metal member and joined to the first metal member to form a flared joint; and
   a joining metal portion formed by irradiating a filler material and the first metal member with a laser, the filler material being disposed at a lap portion where the first metal member is joined to the second metal member,
   wherein
   the first metal member is an aluminum alloy member,
   the second metal member is a steel member,
   the filler material is an aluminum-based alloy filler,
   a maximum thickness of an intermetallic compound formed at an interface between the second metal member and the joining metal portion is 3 µm or less,
   in the curved surface portion of the first metal member on which the flared joint is formed, a melted portion and a non-melted portion are formed in this order in a cross-sectional direction of the first metal member from the side of the first metal member on which the joining metal portion is formed,
   the melted portion has a depth d2 and the non-melted portion has a depth d1, d1 and d2 being measured in the cross-sectional direction of the first metal member and satisfying $0.5 \leq d1/(d1+d2) \leq 0.9$, and
   in a direction in which the second metal member extends in a flared manner, a maximum length of a region in which the second metal member and the joining metal portion are joined to each other is 2 to 4 mm.

2. The joined body according to claim 1, wherein a bend radius of the curved surface portion of the first metal member is 0.5 to 5 mm.

3. A method for producing a joined body of dissimilar metals, the method comprising:
   placing a filler material in a lap portion where a first metal member having a curved surface portion is joined to a second metal member having a higher melting point than the first metal member to form a flared joint; and
   irradiating the filler material and the first metal member with a laser beam at an irradiation angle inclined by 15 degrees or less with respect to a joint surface of the flared joint to form a joining metal portion,
   wherein
   the first metal member is an aluminum alloy member,
   the second metal member is a steel member,
   the filler material is an aluminum-based alloy filler,
   a maximum thickness of an intermetallic compound formed at an interface between the second metal member and the joining metal portion is 3 µm or less,
   in the curved surface portion of the first metal member on which the flared joint is formed, a melted portion and a non-melted portion are formed in this order in a cross-sectional direction of the first metal member from the side of the first metal member on which the joining metal portion is formed,
   the melted portion has a depth d2 and the non-melted portion has a depth d1, d1 and d2 being measured in the cross-sectional direction of the first metal member and satisfying $0.5 \leq d1/(d1+d2) \leq 0.9$, and
   in a direction in which the second metal member extends in a flared manner, a maximum length of a region in which the second metal member and the joining metal portion are joined to each other is 2 to 4 mm.

4. The method according to claim 3, wherein during the irradiating, the laser beam is shifted toward the first metal member side from a position where the filler material is disposed.

5. The method according to claim 4, wherein the laser beam has a beam diameter of 0.1 to 3.0 mm.

* * * * *